United States Patent [19]
Basting et al.

[11] Patent Number: 6,014,206
[45] Date of Patent: Jan. 11, 2000

[54] STABILIZATION OF ANGULAR AND LATERAL LASER BEAM POSITION

[75] Inventors: Dirk Basting; Uwe Stamm; Klaus Mann; Jens Ohlenbusch, all of Göttingen, Germany

[73] Assignee: Lambda Physik GmbH, Germany

[21] Appl. No.: 09/162,424

[22] Filed: Sep. 28, 1998

[51] Int. Cl.$^7$ .................................................. G01B 11/26
[52] U.S. Cl. ........................................... 356/138; 372/107
[58] Field of Search ............ 372/107, 57; 359/555–557; 356/152.1, 138

[56] References Cited

U.S. PATENT DOCUMENTS

| | | | |
|---|---|---|---|
| 4,146,329 | 3/1979 | King et al. | 356/152 |
| 4,514,849 | 4/1985 | Witte et al. | 372/29 |
| 4,576,480 | 3/1986 | Travis | 356/152 |
| 4,656,641 | 4/1987 | Scifres et al. | 372/103 |
| 5,033,061 | 7/1991 | Hobart et al. | 372/107 |
| 5,069,527 | 12/1991 | Johnson, Jr. et al. | 359/823 |
| 5,764,678 | 6/1998 | Tada | 372/57 |

OTHER PUBLICATIONS

Japanese Patent Office, Patent Early Disclosure Gazzette, Public Disclosure No. Sho 58–222585, Publication Date: Dec. 24, 1983, Application No. Sho 57–104692, Application Date : Jun. 19, 1982, Inventor : Kunihisa Wakabayashi et al.

"Optics and Optical Instruments—Lasers and Laser–related Equipment—Vocabulary and Symbols", International Standard, 1994.

"Optics and Optical Instruments—Lasers and Laser—related Equuipment—Test Methods for Laser Beam Parameters : Beam Positional Stability", BSI Standards, Nov. 1995.

Optics Communications, vol, 150, No. 1–6, May 1998.

*Primary Examiner*—Robert H. Kim
*Assistant Examiner*—Layla Lauchman
*Attorney, Agent, or Firm*—Limbach & Limbach LLP

[57] ABSTRACT

The present invention is an apparatus and method for stabilization of laser output beam characteristics by automatically adjusting the angular and the lateral positions of the output beam. A component of the output beam is detected at a far field location and also at a near field location along an optical path of the component. Both the angular and the lateral positions of the output beam are determined, as well as characteristics of the output beam, after the component is detected at both the near and the far field locations. Both the angular position and the lateral position of the output beam are automatically adjusted to optimize the output beam. The adjustment of both the angular position and the lateral position are made possible by using a beam steering device preferably including two mirrors.

43 Claims, 6 Drawing Sheets

STABILIZATION OF ANGULAR AND LATERAL LASER BEAM POSITION

BACKGROUND OF THE INVENTION

1. Field of the Invention

The present invention relates to a laser beam stabilization technique, and more particularly to optimizing a laser output beam by automatically adjusting angular and lateral beam positions based on near and far field beam detection information.

2. Discussion of the Related Art

Lasers are currently being used for industrial material processing. Examples of industrial material processing uses include TFT (thin film transistor) annealing for, e.g., flat panel displays such as for notebook computers or automobile status displays, microlithography and microhole drilling for ink jet nozzles and multichip modules. A laser based work station may be used in these cases and others. The work station includes a laser, a beam delivery system, a mask imaging system and a part handling unit. Optical alignment of the complete system is complicated because even slight deviations of the laser beam from an ideal, or most efficient, position results in reduced performance of the system.

Trained personnel are needed to perform very precise alignment techniques. These techniques are time-consuming, taking several hours in some cases depending on the nature of the system and its components. A complete beam delivery system alignment may be necessary, e.g., after maintenance is performed on an excimer laser resonator such as when a mirror of the resonator requires replacement.

A known beam alignment technique for dye laser applications is performed using an assembly for rotating the laser beam. See U.S. Pat. No. 4,514,849 to Witte et al. The rotation is caused by a rotating wedge. Small perturbations in the output power are then resolved by examining orthogonal components of the rotating beam. Adjustments are automatically made based on the nature of the perturbation information generated by the rotating wedge assembly, to maximize the output of the dye laser.

In another technique, a resonator mirror is modulated in one direction at a first frequency and in another direction, substantially orthogonal to the first, at a second frequency. See U.S. Pat. No. 5,033,061 to Hobart et al. A reference signal correlated with the beam profile is separately extracted for each of the two directions of modulation. Signals for each direction are separately demodulated and error signals are generated. Laser beam alignment is controlled based on information gathered from the error signals.

A similar technique measures the intensity of an output beam for several positions of an adjustable resonator mirror. See Japanese Patent Application Public Disclosure No. Sho 58-222585. The resonator mirror is adjustable in two orthogonal directions and is positioned for operation where the output beam intensity profile is optimal.

The techniques disclosed in Hobart et al., Witte et al., and the Japanese application are understood to improve an output laser beam efficiency by detecting a beam component at one location, and analyzing information in two orthogonal directions. In this way, lateral laser beam positioning at the one location and the efficiency of the laser output beam are improved in both of the orthogonal directions.

Another system for automatically aligning a high power laser beam is disclosed in U.S. Pat. No. 4,146,329 to King et al. The system uses a HeNe-laser beam pre-aligned and coaxial with the high power beam. Each coaxial beam is redirected by a two-axis, gimballed turning mirror. An extraction mirror diverts the main beam and allows the HeNe alignment beam to pass through a small hole at its center. A null position sensor detects the alignment beam. Based on information of the position and intensity of the alignment beam, the position of the high power beam is adjusted to optimize its alignment and output efficiency.

U.S. Pat. No. 4,576,480 to Travis also discloses a technique using a HeNe-alignment beam coaxially directed with a main $CO_2$-laser beam. In Travis, the periphery of an alignment aperture is scanned, and misalignment is detected when an electrical detection signal is not constant during traversal of the periphery of the aperture. Each of the techniques of King et al. and Travis utilizes a separate alignment beam to improve the performance of a laser system.

Another technique involves measuring a beam diameter at two locations along its optical path. See U.S. Pat. No. 5,069,527 to Johnston, Jr. et al. In Johnston, Jr. et al., a method is disclosed wherein two axis measurements of a beam profile are detected using a spinning aperture having orthogonally oriented 45 degree opposed knife edges. Variations in the intensity of the beam are measured across its diameter at two locations along an optical path of the beam. The spinning aperture is at the second location when it has rotated by 180 degrees from the first location. Thus, the second location is removed from the first location along the optical path of the beam a distance equal to twice the radius of the circular path of the spinning aperture. In each case, a lens for creating an imaged beam waist is used. Johnston, Jr. et al. provides an instrument, separate from the laser system itself, used for monitoring the positional stability of a laser beam. The instrument does not, however, provide a means of controlling and stabilizing an alignment of the beam.

A precise system for optimizing, controlling and stabilizing a laser output beam is needed. This is particularly true today because advances in the industrial material processing techniques described above are necessitating finer and finer precision laser output beams. Not only is lateral positional precision desired, but also angular precision. To achieve the appropriate degree of precision, a beam detection and adjusting apparatus is desired which measures beam position at two optically significantly spaced-apart locations along its optical path. Automatic adjustment of the lateral and/or angular position of the beam is also desired based on information gathered from the two beam location measurements.

SUMMARY OF THE INVENTION

The present invention is an apparatus and method for optimizing laser output beam direction by detecting and automatically adjusting the angular and the lateral positions of the output beam. A component of the output beam is detected at a near field location to determine the lateral position of the beam. A component of the beam is also detected at a far field location to determine the angular direction of the beam. Both the angular position and the lateral position of the output beam are then automatically adjusted to optimize the positional stability of the output beam.

DETAILED DESCRIPTION OF THE PREFERRED EMBODIMENT

For perspective, a lateral position of a laser beam is roughly the position of a cross section of the beam with respect to a plane having a normal parallel to a beam propagation vector direction. When only a lateral position of a beam changes or is adjusted, the beam cross section moves within this plane. That is, the centroid of the beam displaces a distance in the plane and the direction of the translationally changed or adjusted beam propagation vector remains parallel to the original beam propagation vector direction. Beam positional stability is defined at International Standards ISO 11670 & ISO 11146.

Again for perspective, an angular position of a laser beam is roughly the beam propagation vector direction discussed above. When only an angular position of a beam changes or is adjusted, the beam propagation vector direction changes by an angular amount and the lateral position remains the same at the "pivoting" location along the optical path of the beam. That is, the beam is effectively rotated about a fixed pivot, as opposed to being translated as with the lateral positioning described above. Of course, when the angular position of a beam changes or is adjusted, a lateral position of the beam at any location beyond the pivot location along the optical path of the beam will change assuming no additional correctional optics are used. The pivoting location, as well as the means for laterally adjusting the beam position, will be described below and in the accompanying drawings as a beam steering unit 200. As with beam positional stability, beam angular stability is defined at International Standards ISO 11670 & ISO 11146.

Whether an angular or lateral position of a laser beam changes, the beam intensity and lateral beam position will likely change at critical locations such as at aperture locations and/or at a point of application. When a lateral position changes from an optimal position at, e.g., a circular aperture location, the beam intensity and quality is continuously reduced as the position of the maximum of the beam intensity profile moves radially away from the geometric center of the aperture. In this case, a greater part of the beam is blocked at aperture edges and varying beam diffraction effects occur as greater asymmetry is introduced between points along the aperture edge.

Inefficiencies at aperture locations also produce reduced intensities at application locations. Also, beam quality at application locations is affected by asymmetric aperturing and angular distortion effects. Lateral position effects may also occur as the beam profile itself becomes more and more asymmetric.

Figure 1:
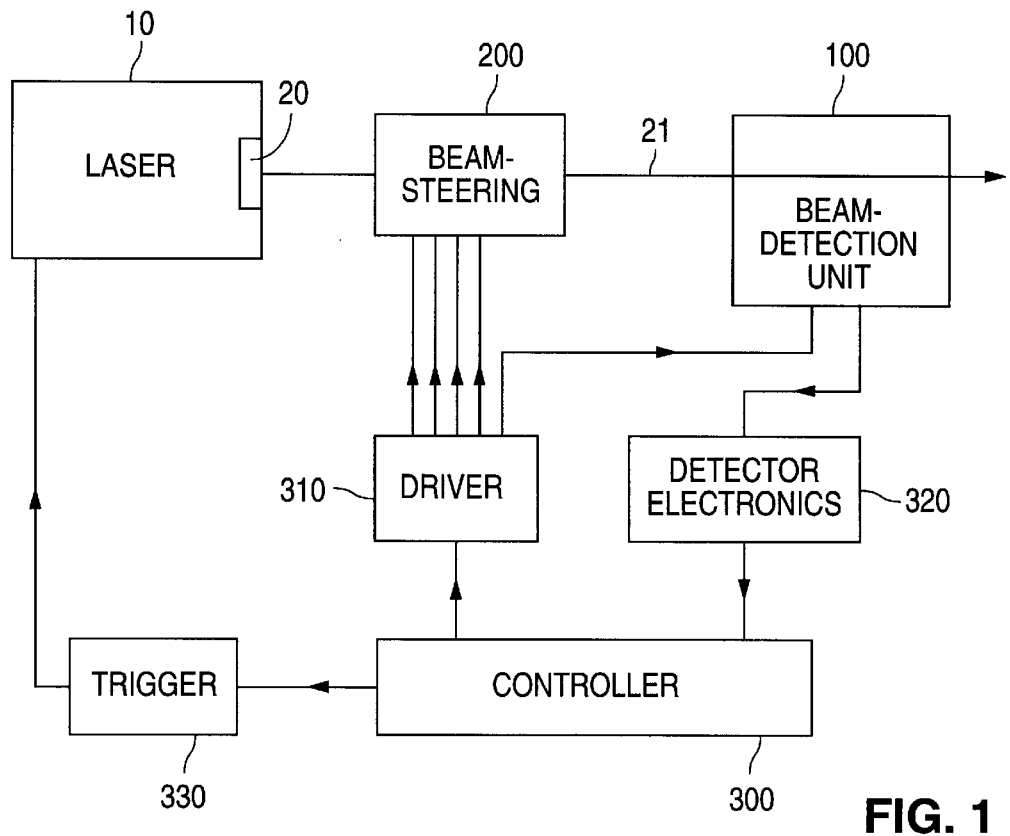
FIG. 1 shows a layout of a beam alignment system according to a preferred embodiment of the present invention.

FIG. 1 shows a layout of a beam alignment system according to a preferred embodiment of the present invention. Using the beam alignment system of FIG. 1, precise determination of a lateral and an angular position of an output beam are achieved. After this determination is made, the angular and lateral beam positions are adjusted automatically for optimization of the direction, quality and intensity of the beam at critical locations along its optical path. The automated beam alignment system of FIG. 1 stabilizes the angular position and the lateral position of a laser output beam without time consuming manual realignment procedures via a feedback algorithm and electronics. The lateral beam position is stabilizable using the system of FIG. 1 to within 0.5 mm or better. The angular beam position is stabilizable to within 0.1 mrad or less.

The automated beam alignment system of the preferred embodiment of FIG. 1 includes a beam detection unit 100, a beam steering unit 200, a driver 310 for the beam steering unit 200, a trigger unit 330, a controller 300 and detector electronics 320. The system of FIG. 1 includes a laser 10 which generates an output laser beam 21. The laser 10 has a laser beam exit window 20. Although the system is particularly desired to be used with excimer lasers such as the KrF-, ArF-, $F_2$-, XeCl- and XeF-excimer lasers, among others being used currently and to be used in the future with, e.g., thin film transistor annealing or photolithographic processing of IC chips, the system is believed to be applicable to any of a number of laser systems such as dye lasers, ion lasers, $CO_2$-lasers, solid state lasers, diode lasers, YAG-lasers, and virtually any laser system wherein precision angular and lateral alignment is desired.

The controller 300 is preferably a PC or other microprocessing unit. One function of the controller 300 is to control the trigger unit 330 for triggering the laser 10. Another function of the controller 300 is to control the driver unit 310 for controlling the alignment of the optics of the beam steering unit 200 which ultimately produces any desired optical adjustments in the lateral and angular positions of the laser beam. The detector electronics 320 process information received by the beam detection unit 100 and commands received by and issued from the controller 300 and facilitate interfacing of the controller 300 with the beam detection unit 100.

The controller 300, the driver 310 and the detector electronics 320 are each preferably configured for automatic beam positioning and stabilization. Manual positioning is also possible, but is not preferred, due to the advantages of automatic over manual adjustment described above. When and if manual adjustment is performed using a beam detection unit 100 in accord with the present invention, any of the controller 300, the driver 310, the detector electronics 320 and the trigger unit 330 may be different than those used with the automatically adjusting system of the preferred embodiment, or each may be simplified or not used at all.

Figure 2:
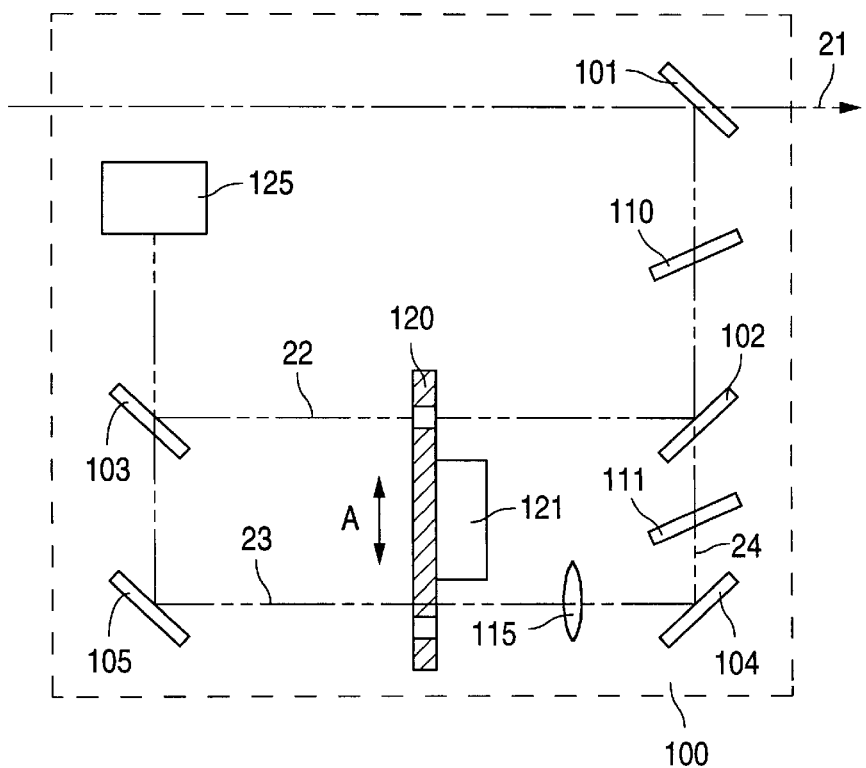
FIG. 2 shows a preferred detection unit of the beam alignment system of FIG. 1.

FIG. 2 shows a preferred optical arrangement of the detection unit 100 of the beam alignment system of FIG. 1. A component of an output laser beam 21 is diverted by a first beam splitter 101. The first beam splitter 101 is preferably a plate formed from a material such as fused silica, $CaF_2$ or $MgF_2$. The preferred plate has an antireflection coating on one surface to prevent double reflection and the formation of two images. Alternatively, any of a wide variety of conventional types of beam splitters may be used such as a single reflection wedge plate.

The component just diverted by the first beam splitter 101 from the main output beam 21 for analysis by the beam detection unit preferably next encounters a first attenuator 110. The first attenuator 110 is used to adjust the intensity of the diverted component of the output laser beam 21 to match an appropriate detection range of a subsequently encountered detector element 125. Use of the first attenuator 110 provides flexibility with respect to the intensity ratio of the two components split by the first beam splitter 101, and the detection range of the detector element 125.

After attenuation by the first attenuator 110, the component diverted from the main beam 21 next preferably encounters a second beam splitter 102. The second beam splitter 102 splits the diverted component into a first reflected component 22 and an unreflected component 24. The first reflected component 22 then travels along the beam path labelled "22" in FIG. 2. The second beam splitter 102 may be similar to the first beam splitter 101. That is, the beam splitter 102 may be a plate having an antireflection coating on one side or a single reflection wedge plate. The second beam splitter 102 may also have a dielectric coating on one surface for adjusting the intensity of the first reflected component 22. The second beam splitter 102 preferably reflects the first reflected component 22 along its beam path 22.

The component 24 incident on but unreflected by the second beam splitter 102 preferably encounters a second attenuator 111. The second attenuator 111 attenuates the unreflected component 24 to adjust the intensity of the component 24 with respect to the intensity of the component 22 reflected by the second beam splitter 102. The second attenuator 111 provides flexibility regarding the ratio of the intensities of the components 22 and 24 reflected and unreflected by the second beam splitter 102, and the range of detection intensities, and thus the sensitivity of the detection element 125, when the detection element 125 is the sole detection element used with the beam detection unit 100, as is preferred.

After attenuation by the second attenuator 111, the component 24 unreflected by the second beam splitter 102 preferably encounters a first mirror 104. The first mirror 104 reflects the component 24 along the beam path labelled "23" in FIG. 2. The first mirror 104 preferably reflects the attenuated component 24 in the propagation direction of the incident component 24, the incident component 24.

Preferably with respect to the first mirror 104 and the second beam splitter 102, each respectively reflects the component 23 and the first reflected component 22 at a same or similar angle to the propagation direction of the component diverted from the main beam 21. The component 22 reflected from the second beam splitter 102 and the component 23 reflected from the first mirror 104 are now preferably propagating along parallel, and not collinear, optical paths 22 and 23.

The second reflected component 23 is now refracted by a focusing lens 11 5 which is located along the beam path of the second reflected component 23. The purpose of the focusing lens is to produce a far field beam profile in only a small geometrical distance along the beam path of the component 23. When beam positional stabilization in one axial direction is desired, a cylindrical lens may be used. When beam positional stabilization in two directions is desired, a spherical lens is preferably used.

Preferably, a chopper 120 is used to block one beam and allow the other to pass without change, such that the far field beam 23 and the near field beam 22 may be detected alternately by the same detector 125. The chopper 120 may have two apertures, which are movable, as illustrated by arrow A in FIG. 2. Each of the two apertures may alternatively be centered on one of the two beams 22 or 23, while one beam stop or two beam stops alternately block one beam 22 or 23 and allow the other to transmit through the aperture.

Each of the first and second reflected components may be modulated at the same or different frequencies to improve detection sensitivity. When only one modulation frequency is used, the chopper operates as above. When the modulation frequencies are different, both components 22 and 23 may be transmitted simultaneously. The chopper 120 is preferably powered by a chopper drive module 121, which may be a motor or pneumatic or hydraulic element. A lock-in amplifier is connected to the detector 125 for sensitively detecting each of the two signals. Two different choppers may also be used.

Alternatively, two detectors may be used, one for each of the first and second reflected components 22 and 23, wherein their modulation frequencies, if any, may be the same or different. In this case, the second mirror 105, the third beam splitter 103 and the chopper 120 are not used.

The second reflected component 23 travelling along beam path 23 impinges and is redirected by a second mirror 105. The second reflected component 23 is preferably reflected by the second mirror 105 at a right angle to beam path 23.

A preferred focal length of the lens 115 is in a range from 0.1 to 3.0 meters and specifically may be around 1.0 meter. Typical geometric distances between any of the components of FIG. 2 are preferably in the range from 5 to 50 cm. The dashed box 100 shown enclosing the arrangement in FIG. 2 has preferred dimensions in the range from 40 to 100 cm.

The first reflected component 22 travelling along beam path 22 impinges and is redirected by a third beam splitter 103 that is preferably the same or similar to the second beam splitter 102, having a dielectric coating for adjusting the reflected intensity. Alternatively, the third beam splitter 103 is the same or similar to the first beam splitter, having no coating, or another conventional beam splitter. Preferably, the first and second reflected components 22 and 23, respectively, are redirected such that they are collinear after being redirected by the third beam splitter 103 and the second mirror 105, respectively.

In this way, a single detector element 125 may receive both the redirected first reflected component 22 and the redirected second reflected component 23. The detector element 125 may be a linear diode array, a CCD camera or a position sensitive diode, for example. The detector may use a lock-in amplifier for enhanced sensitivity and signal-to-noise ratio.

The above described detection unit 100 effectively probes the laser output beam 21 at two locations that are at significantly different optical distances from the laser output aperture 20. In fact one component 22, which travels along beam path 22, is probed at an optically near field location, and the other component 23, which travels along beam path 23, is probed at an optically far field location. Preferably, the near and far field locations are those described at International Standards ISO 11146 and 11670. Thus, the detector element 125 is at the far field location when it is in the focal plane of a focusing element, such as a lens 115. A near field location is defined such that the image plane of an imaging element is at the near field location.

Alternatively and generally, a far-field location is an observation point, e.g., at the detector 125, which is optically located very far from the laser output aperture 20. By "very far", it is meant that the optical path from a source point, e.g., at the beam splitter 101 or the beam splitter 102, to the observation point, e.g., the detector 125, depends approximately linearly on the coordinates of the source point. Also, alternatively and generally, a near-field location is an observation point, e.g., at the detector 125, which is optically located close to the source point, e.g., the beam splitter 101 or the beam splitter 102. By "close", it is meant that the optical path from a source point, e.g., at the beam splitter 101 or the beam splitter 102, to the observation point, e.g., at the detector 125, depends at least approximately parabolically on the coordinates of the source point.

At the near-field location, which is close to the laser beam exit 20, an intensity distribution of the laser beam is measured. That is, an intensity distribution, or laser beam profile, is measured at the near-field location.

Figure 3:
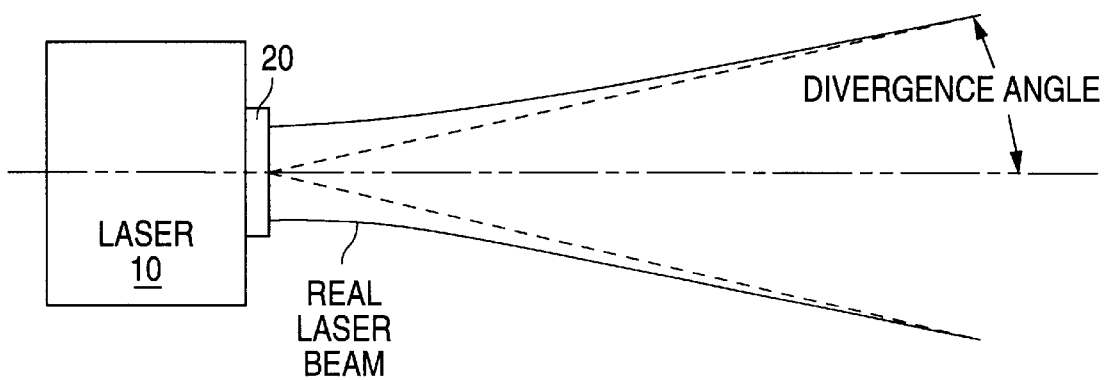
FIG. 3 illustrates how the divergence of a laser beam changes with distance from a laser beam exit.

The far field location is preferably in the focal plane of the focusing lens. Alternatively, it is geometrically "far away" from the laser beam exit 20. By far away, it is meant that the divergence properties of the laser beam no longer depend on the distance from the laser beam exit. As can be seen in FIG. 3, the divergence angle of the laser beam changes with distance from the laser beam exit 20 in the near field. However, in the far field, beginning at some further distance from the laser beam exit 20, the divergence angle no longer varies with distance from the laser beam exit 20.

The controller 300 preferably determines the near-field intensity distribution, or beam profile, and the far-field intensity distribution. The near field beam profile measurement allows a determination of a lateral position of the output beam 21. The far-field intensity distribution measurement allows a determination of an angular position or direction of the output beam 21. An optimal beam position after initial alignment can be measured and stored as a reference position in the controller 300, to facilitate future adjustments based on detected angular and lateral beam positions.

During laser operation or after maintenance is performed on the laser system, the detection unit 100 can easily determine whether and to what extent the output beam 21 is deviated from optimum by comparing current lateral and angular positions with those stored as reference data. The controller 300 can activate a feed back loop for adjustment and stabilization of the laser beam angular and lateral positions.

The beam detection unit 100 preferably effectively measures a center of gravity of a profile of the beam 21 at the two locations, i.e., near- and far-field, along its optical path. Alternatively, a width of the laser beam can be measured and the feedback algorithm can stabilize the edge of the beam profile. The probe locations are significantly separated along the optical path, such that the angular position of the output beam 21 is determinable with a useful degree of precision. In the preferred embodiment, as described above, the beam 21 is effectively probed at beam path 22 in the near field, and at beam path 23 in the far field via use of a focusing lens. The focusing lens allows for the probing locations to be physically close together, yet optically spaced significantly apart.

Various software can be used to instruct the controller 100 to calculate and determine the angular and lateral beam positions. When the center of gravity approach is used, standard ISO 11670 and ISO 11145 can be consulted and/or used. The feedback algorithm then facilitates the stabilization of the beam 21 after the beam 21 is first adjusted from its deviated lateral and angular positions to optimal positions.

Figure 4:
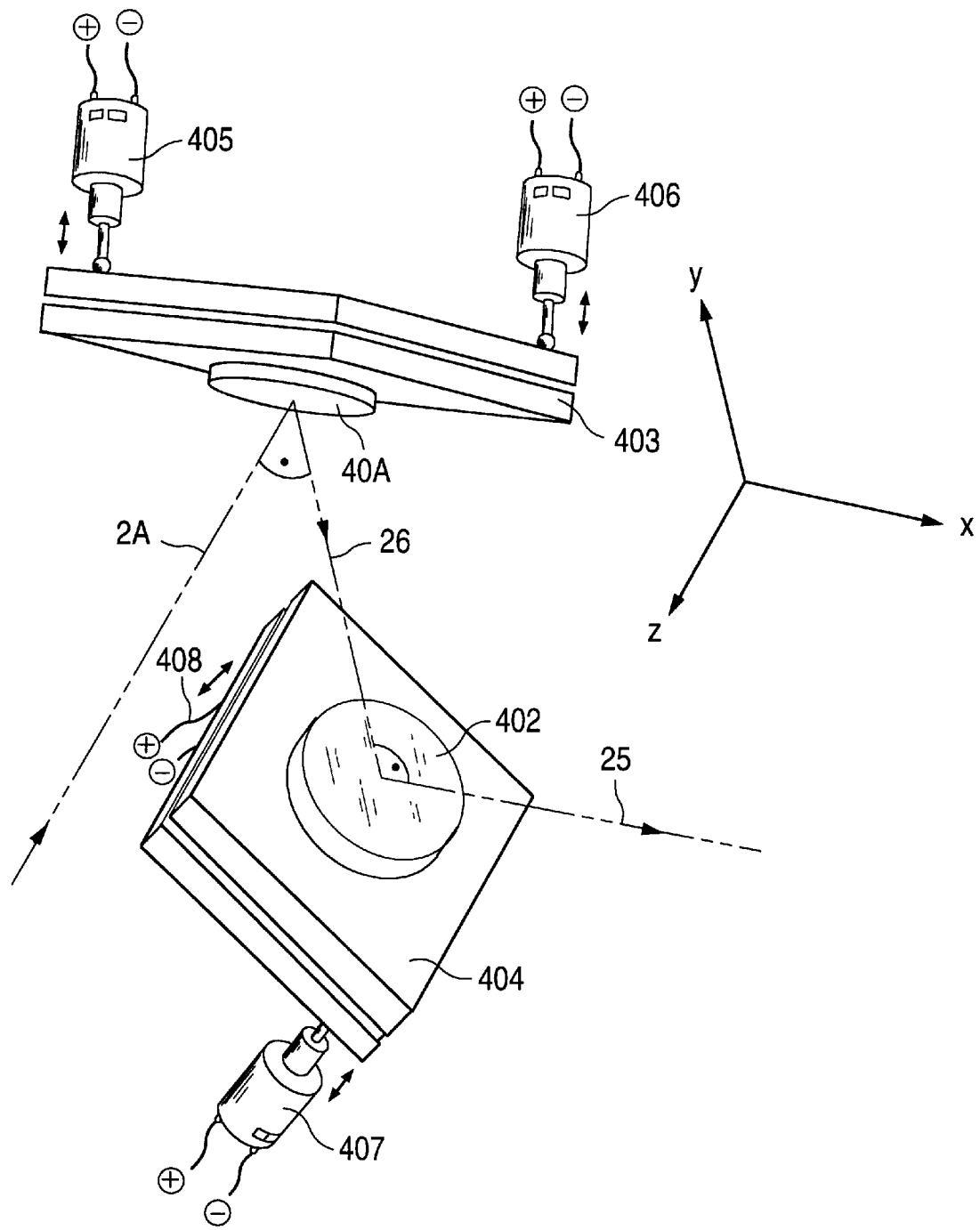
FIG. 4 shows a preferred beam steering unit of the beam alignment system of FIG. 1.

FIG. 4 shows a preferred beam steering unit 200 of the beam alignment system of FIG. 1. The beam steering unit 200 is preferably external to the resonator. Beam adjusting may be alternatively performed by using one or both resonator mirrors, either independently or together with another mirrored or refractive optical unit. The resonator mirror could be motor driven, e.g., for aligning and stabilizing the position of the beam. As another alternative to the beam steering unit 200 of FIG. 4, one or more prisms or other refractive and/or dispersive elements may be used to align and stabilize the beam.

The beam steering unit 200 preferably comprises two substantially planar and orthogonal mirrors 401 and 402 positioned to deflect an incident beam 21, as shown in FIG. 4. An outgoing beam 25 would preferably propagate at a selected angle to the direction of propagation of the incident beam 21 which is incident on one of the mirrors 401 or 402 of the beam steering unit 200.

The beam steering unit 200 preferably comprises a first mirror 401 mounted to a first mirror mount 403, and a second mirror 402 mounted to a second mirror mount 404. The first mirror mount 403 is coupled to a first actuator 405 and a second actuator 406. The second mirror mount 404 is coupled to a third actuator 407 and a fourth actuator 408. Each actuator 404, 405, 406 and 407 can be one of a variety of actuators including a DC motor, a stepping motor, a piezo actuator, and other conventional actuators.

The first and second actuators 405 and 406 coupled to the first mirror mount 403 are configured with the first mirror mount 403 for optimal flexibility with regard to adjustment of the position of the first mirror mount 403. The first mirror 401, which is mounted to the first mirror mount 403, should be orientationally adjustable such that a normal to the first mirror 401 can be redirected at any angle within a continuous solid angle about its present normal. The normal to the first mirror 401 is thus continuously adjustable with respect to each of two spherical angular coordinates.

After the beam 21 impinges the first mirror 401 and reflects from the first mirror 401, it propagates along the path labelled "26" in FIG. 4 and is hereinafter called beam 26. Beam 26 is redirected toward the second mirror 402. The second mirror 402 is positioned so that the beam 26 impinges the second mirror 402 substantially at its center, near to its center, or at least such that the edge of the second mirror 402 does not act as an aperture for the beam 26.

The third and fourth actuators 407 and 408 coupled to the second mirror mount 404 are configured with the second mirror mount 404 for optimal flexibility with regard to adjustment of the position of the second mirror mount 404. The second mirror 402, which is mounted to the second mirror mount 404, should be orientationally adjustable such that a normal to the second mirror 402 can be redirected at any angle within a continuous solid angle about its present normal. The normal to the second mirror 402 is thus continuously adjustable with respect to each of two spherical angular coordinates.

The beam 26 reflects from the second mirror 402 and propagates along the path labelled "25" to be hereinafter called the redirected beam 25. The mirrors 401 and 402 may be aligned to direct the beam 25 to propagate away from the beam steering unit 200 at a selected angle to the incident beam 21. With this configuration, the beam 21 is adjustable with optimal flexibility within a continuous solid angle about any present normal and is thus adjustable about both spherically angular coordinates. The beam 21 is also adjustable translationally such that the beam 25 may be translated at any time from its present position to another position parallel (or otherwise) to it present position. The beam steering unit 200 thus provides a means to adjust both the angular and lateral positions of the beam 25, which may be the output beam of the system. This adjustment flexibility is important because the beam 25 may be used for thin film transistor annealing processes and/or precise photolithographic applications or otherwise as described above.

As an alternative to the preferred arrangement of FIG. 4, other optics may be used for redirecting the incident beam 21 along the selected optical path 25 with lateral and angular flexibility. Such other optics may include one or more prisms, one or more wedge plates or two wedges.

Figure 5:
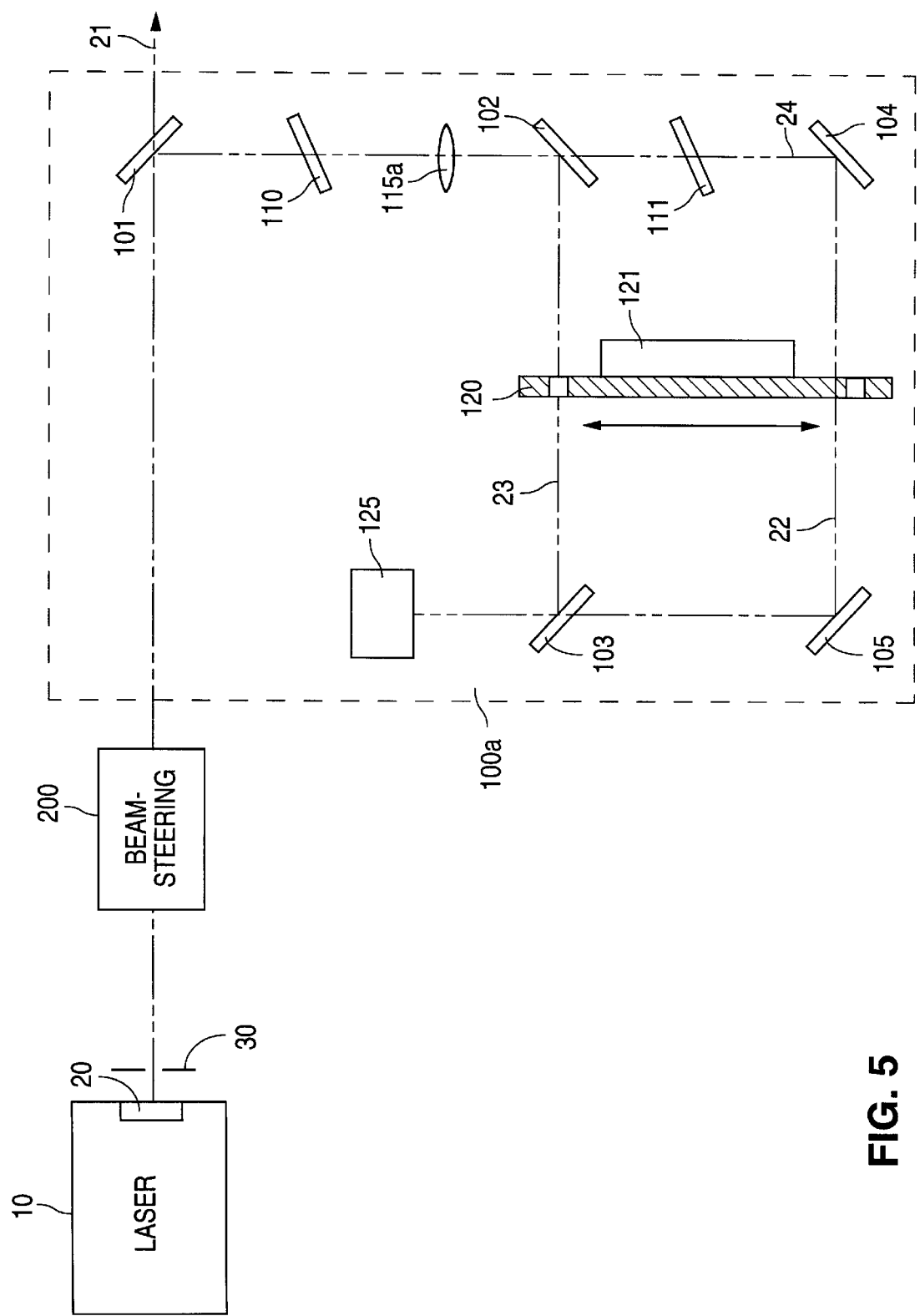
FIG. 5 shows a laser system including a second embodiment of a beam alignment system according to the present invention.

FIG. 5 shows a modified arrangement. Some differences between the modified arrangement of FIG. 5 and the arrangement of FIG. 2 will be described here. The modified arrangement of FIG. 5 includes a beam steering unit 200 between the laser beam exit 20 and the components enclosed by the dashed box 100a. Although not shown, the beam steering unit 200 may also be located in this same position with respect to the laser beam exit 20 and the dashed box 100 in the arrangement of FIG. 2.

The principle difference between the embodiment of FIG. 5 and that of FIG. 2 is that the lens 115a of FIG. 5 is inserted before the second beam splitter 102, instead of after the third beam splitter 104, as it is in FIG. 2. The lens 115a is used both as an imaging lens to image a near field plane at aperture 30 onto the detector 125 (along the beam path 22), and as a focusing lens wherein the detector 125 is located in the focal plane of the lens 115a to detect the far field intensity distribution. This modified arrangement allows for the measurement of a near field beam profile in a plane located in the laser housing, for example, in the shutter plane or the output mirror plane. In contrast, in the embodiment of FIG. 2, the near field beam profile is measured away from the laser housing and without the use of an imaging lens.

Figure 6:
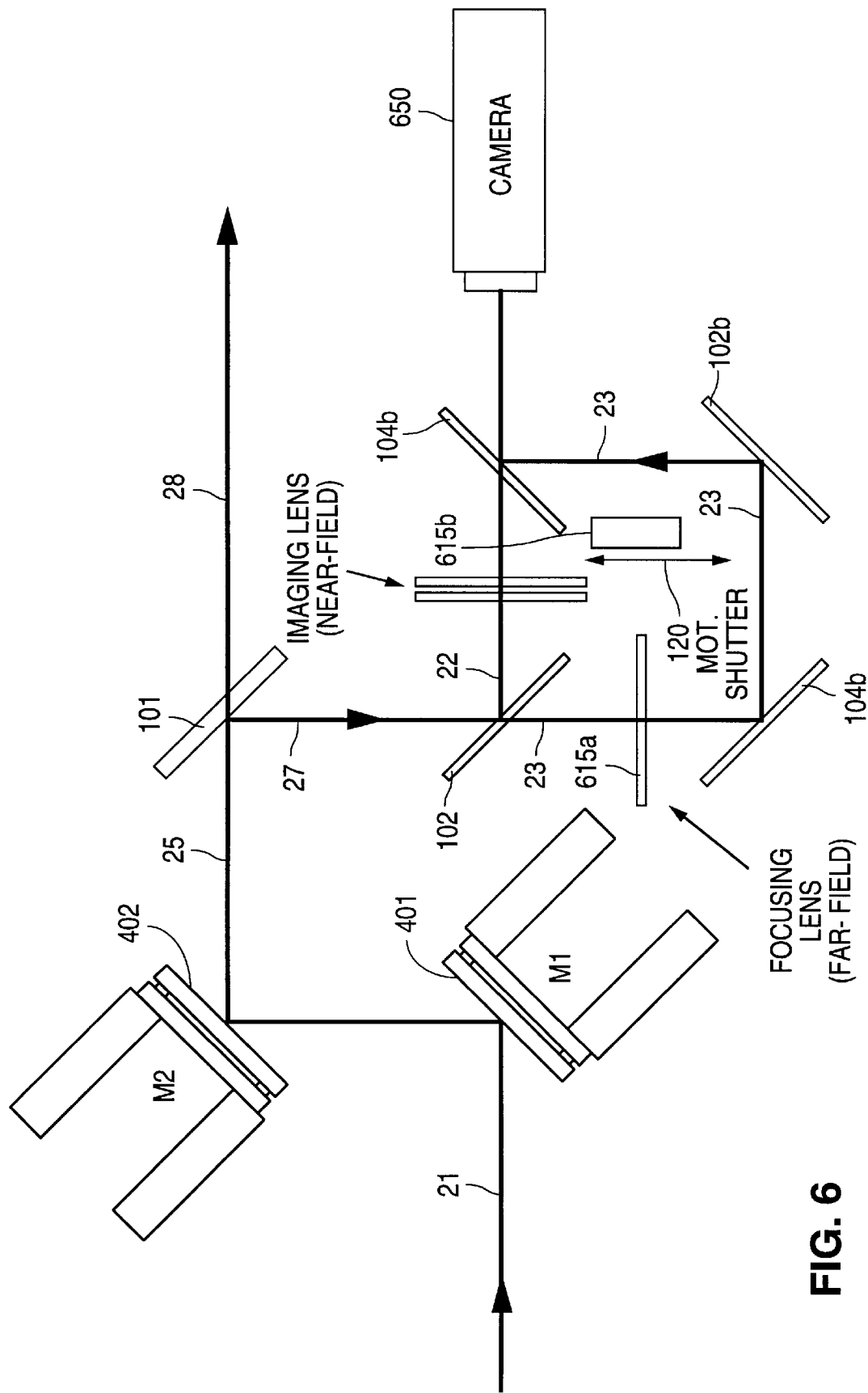
FIG. 6 shows a laser system including a third embodiment of a beam alignment system according to the present invention.

A further arrangement of an alignment device in accord with the present invention is shown in FIG. 6. Generally, the arrangement of FIG. 6 differs from the arrangements of FIGS. 2 and 5 because both a focusing lens 615a and a separate imaging lens 615b are used. The detector 650 is located in the focal plane of the focusing lens 615a. The near field beam profile may be separately measured at any of several convenient locations. For example, the laser aperture may be placed at the mirror 401 or the mirror 402 or some other place without affecting the position of the focusing lens 615a or the focal plane of the focusing lens 615a at the detector 650.

Specifically with regard to the arrangement of FIG. 6, the laser output beam 21 is redirected by the adjustable mirrors 401 and 402. The redirected beam 25 is then incident upon the first beam splitter 101, wherein a portion 27 of the beam is reflected toward the beam stabilization arrangement. That reflected portion 27 impinges upon a second beam splitter 102 which reflects a first portion 22 and allows a second portion 23 to pass. The first portion 22 then passes through an imaging lens 615b and is imaged by the imaging lens 615b onto a CCD camera 650.

The second portion 23 passes through the second beam splitter 102 and is focused by a focusing lens 615a. The second portion 23 is then redirected by two mirrors 104b and 102b to the beam splitter 104b, wherein a portion of the focused second portion 23 is redirected into the CCD camera 650.

The system of FIG. 6 makes use of two external steering mirrors M1 and M2 on motorized mirror mounts. A single CCD camera 650 is employed for selective monitoring of both the near-field and the far-field profile of the laser beam 21.

The near field profile of the laser beam 21 is probed at the location of mirror M2 using a projection lens 615b, which images the beam profile at M2 onto the CCD camera 650, or chip. From this profile the lateral beam position can be evaluated. The angular direction of the beam is monitored by measuring the far-field profile of the laser beam in the focal plane of the focusing lens 615a. A motorized shutter 120 is used to switch between the two beam paths of the detection device.

Determination of the actual beam position P on mirror M2 provides information which can be used to activate a feedback loop for readjustment or stabilization of the beam on a formerly determined reference point P, by adjustment (preferably automated) of mirror M1. This is compensation of beam positional variations.

After stabilizing the beam at position P on mirror M2, the far-field measurement allows evaluation of the current beam direction, which is compared with the reference value determined after initial alignment of the laser. A feedback loop can be activated for stabilization of the beam direction on the reference value by readjustment (again, preferably automated) of mirror M2. This is compensation of beam pointing variations.

The arrangement of FIG. 6 is advantageous for many reasons. One is that, in contrast to adjustment of resonator mirrors, with alignment of external beam steering mirrors, only the beam position and direction are affected, and both the shape of the spatial beam profile and the laser output are not influenced.

Generally, perhaps the most significant advantage of the present invention is that more precise beam profile characteristics are producible reliably at an application location. Less time is required for making needed adjustments to the angular and/or lateral beam positions when the present invention is used. When the automatic adjustment feature is used, the beam is adjusted and stabilized in real time. Moreover, less time need lapse between adjustments, if handled manually, resulting in a more reliable beam profile.

Figure 7:
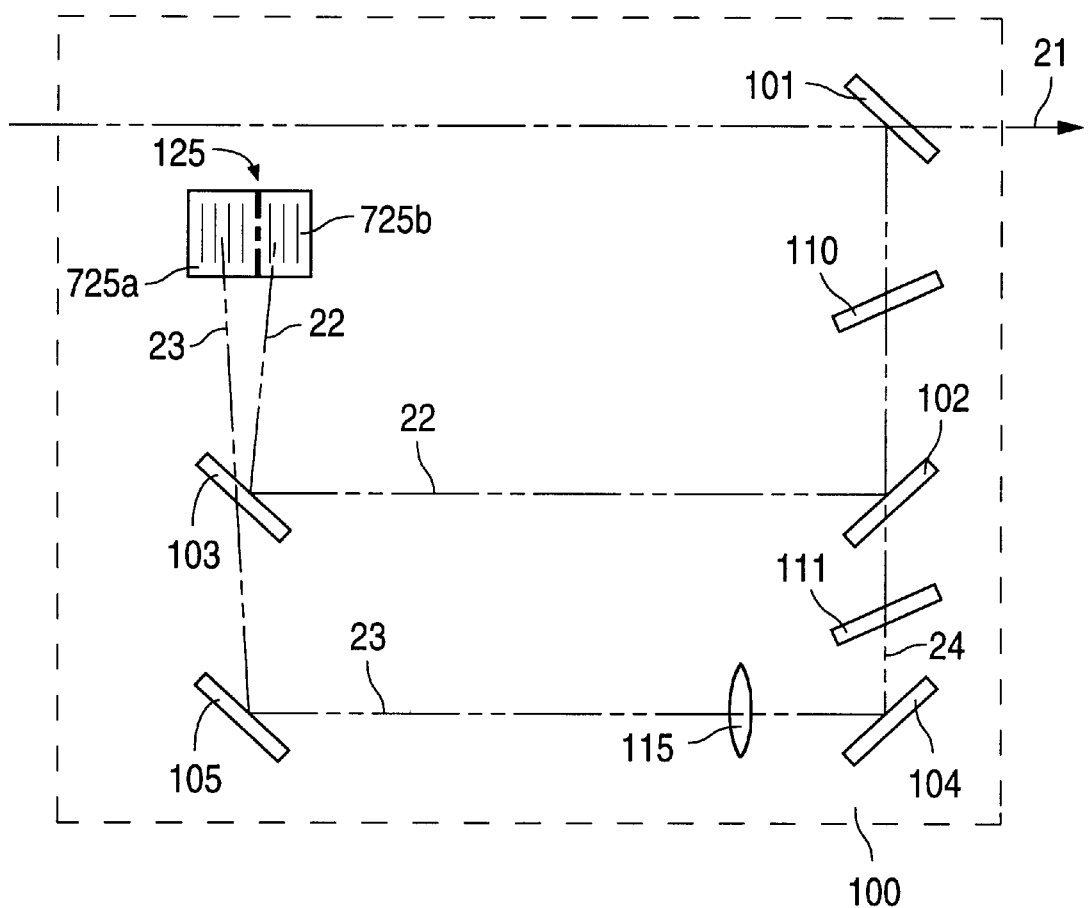
FIG. 7 shows a laser system including a fourth embodiment of a beam alignment system according to the present invention.

A further arrangement of an alignment device in accord with the present invention is shown in FIG. 7. The arrangement of FIG. 7 is similar to the arrangement shown in FIG. 2. The differences the arrangement of FIG. 7 and that of FIG. 2 are described below.

The detector 125 is divided into two halves 725a and 725b. The left detector half 725a is positioned at the focal plane of the lens 115. The left detector half thus intercepts beam path 23. The far-field is thus imaged onto the left detector half 725a. The near-field image plane is imaged onto the right detector half 725b. The right detector half thus intercepts beam path 22.

The component travelling along beam path 22 and the component travelling along beam path 23 may each impinge upon the detector 125 at the same time or different times. The chopper 120 is not used in the arrangement of FIG. 7. The arrangement of FIG. 7 is thus more compact than that of FIG. 2.

What is claimed is:

1. A device for detecting and adjusting a lateral position and an angular direction of an output beam of a laser, comprising:
   at least one detector for sensing the laser beam at a near field location and a far field location along an optical path of said beam;
   a processor for determining the lateral position of the beam based on the near-field measurement and the angular direction of said output beam based on the far field measurement; and means for adjusting the angular direction and the lateral position of the output beam to a predetermined position.

2. The device of claim 1, wherein only one detector is used to measure the laser beam at each of said near field location and said far field location.

3. The device of claim 2, wherein said one detector simultaneously measures near the field location and the far field location.

4. The device of claim 2, wherein a first portion of said one detector measures the near field location while a second portion of said one detector measures the far field location.

5. The device of claim 2, wherein said one detector alternately measures the near field location and the far field location.

6. The device of claim 5, wherein a chopper is used to alternately block the near field measurement and the far field measurement.

7. The device of claim 1, wherein the adjusting means adjusts one or more mirrors for redirecting the beam, wherein the mirrors are located external to a resonator of said laser.

8. The device of claim 1, wherein the adjusting means adjusts one or more prisms for redirecting the beam, wherein the prisms are located external to a resonator of said laser.

9. The device of claim 1, wherein said at least one detector is a CCD camera.

10. The device of claim 9, wherein said CCD camera detects both a near-field profile and a far-field intensity distribution of the beam.

11. The device of claim 10, wherein a focusing lens provides said far field intensity distribution and an imaging lens provides said near field profile.

12. The device of claim 2, wherein a first lens is used to image the near field profile of the beam on said detector.

13. The device of claim 12, wherein a second lens is used to focus the far field intensity distribution of the beam on said detector.

14. The device of claim 12, wherein said first lens is also used to focus the far field intensity distribution of the beam on said detector.

15. The device of claim 1, wherein the laser includes a resonator including adjustable resonator mirrors, and the adjusting means adjusts said resonator mirrors.

16. The device of claim 1, wherein a convex focusing lens is used to create a far field image of the beam at the far field location.

17. The device of claim 1, wherein said adjusting means comprises control and feedback electronics and software.

18. The device of claim 1, wherein said adjusting means automatically adjusts the angular direction and lateral position of said output beam according to information obtained from said detector and said processor.

19. A device for measuring and adjusting a lateral position and an angular direction of a laser beam, comprising:
means for measuring a position of said beam at both a near field location and a far field location;
means for determining a lateral position and an angular direction of said beam based on the near field location and far field location beam position measurements;
means for automatically adjusting the lateral and angular beam positions based on said lateral position and angular direction determinations.

20. A method of optimizing a lateral position and an angular position of a laser beam, comprising the steps of:
measuring the beam at a near field location along an optical path of the beam;
measuring the beam at a far field location along said path of the beam;
determining the angular direction and the lateral position of said beam based on the near and far field measurements of said beam; and
adjusting said beam to a predetermined lateral position and a predetermined angular direction.

21. The method of claim 20, further comprising the step of splitting the laser beam into components, wherein a first component provides a first beam for measuring the position of the beam at said near field location, and wherein a second component provides a second beam for measuring the position of the beam at said far field location.

22. The method of claim 21, wherein a first lens focuses the second component onto a first detector.

23. The method of claim 22, wherein the first component is imaged onto the first detector.

24. The method of claim 23, wherein the first component is imaged onto a first portion of the first detector while the second component is simultaneously focused onto a second portion of the first detector.

25. The method of claim 23, wherein the first component and the second component are alternately imaged onto the first detector.

26. The method of claim 22, wherein the first component is imaged onto a second detector.

27. The method of claim 23, wherein the first component is imaged by a second lens onto said first detector.

28. The method of claim 24, wherein the first component is imaged by an second lens onto said second detector.

29. The method of claim 21, wherein the adjusting step includes the step of automatically adjusting both said angular direction and said lateral position.

30. The method of claim 20, wherein said adjusting step includes the step of adjusting reflective components.

31. The method of claim 20, wherein said adjusting step uses control and feedback software and electronics.

32. A method of optimizing a lateral position and an angular direction of a laser beam using one or more optical components, a detector, a controller and control and feedback software and electronics, comprising the steps of:
measuring the beam position at a far field location along a laser beam path;
measuring the beam position at a near field location along the laser beam path;
determining the angular position and the lateral position of said beam based on said measured beam positions at said near and far field locations; and
automatically adjusting the optical components to optimize the angular direction and the lateral position of said beam using control and feedback software and electronics.

33. The method of claim 32, further comprising the step of splitting the beam into a first component and a second component before detecting either of said near and far field location beam positions.

34. A laser system comprising a resonator and a discharge chamber for producing a laser beam, at least one optical component for adjusting an angular direction and a lateral position of said beam, and at least one detector for measuring a position of said beam at two spaced-apart locations along an optical path, the improvement comprising providing one of said two spaced apart locations in a near field location and the other in a far field location along the optical path.

35. The laser system of claim 34, the improvement further comprising providing a single lens having a focal plane at the detector, and which images the near field plane at the detector.

36. The laser system of claim 34, the improvement further comprising providing a first lens which images the near field plane at the detector and a second lens which has a focal plane at the detector.

37. An excimer laser system, comprising:

a discharge chamber and a resonator for generating an output beam along a first optical path;

a beam steering device along said first optical path;

means for redirecting a first portion of said beam along a second optical path and for redirecting a second portion of the beam along a third optical path;

focusing optics located along said second optical path;

a detector located after said lens along said second optical path; and a controller for adjusting said optical components based on information received from said detector to adjust an angular position and a lateral position of the output beam.

38. The laser of claim 37, further comprising:

imaging optics located along said third optical path before said detector; and means for redirecting said second portion for image detection.

39. The laser of claim 37, further comprising a second detector along said third optical path.

40. An opto-electronic arrangement for stabilizing an angular and a lateral output beam position of a laser, comprising:

means for directing a first portion of said beam along a first optical path and a second portion of said beam along a second optical path;

a detector for measuring said first portion and said second portion;

a first lens for focusing said first portion onto said detector;

means for alternatively blocking said first portion and said second portion; and means for adjusting the lateral position and angular direction of said beam to a predetermined lateral position and a predetermined angular direction based on the measurement of said first and second portions of said beam.

41. The opto-electronic arrangement of claim 40, said first lens further for imaging said second portion onto said at least one detector.

42. The opto-electronic arrangement of claim 40, further comprising a second lens for imaging said second portion onto said at least one detector.

43. A method of optimizing an angular direction and a lateral position of an output beam of a laser using directional optics, one or more lenses, and at least one detector, comprising the steps of:

directing a first portion of said beam along a first optical path and a second portion of said beam along a second optical path;

focusing said first portion onto said at least one detector;

imaging said second portion onto said at least one detector;

measuring said first portion and said second portion; and adjusting the lateral position and angular direction of said beam to a predetermined lateral position and a predetermined angular direction based on the measurement of said first and second portions.

\* \* \* \* \*